United States Patent
Kaigawa et al.

(10) Patent No.: US 7,529,601 B2
(45) Date of Patent: May 5, 2009

(54) VEHICLE INTEGRATED-CONTROL APPARATUS AND VEHICLE INTEGRATED-CONTROL METHOD

(75) Inventors: Masato Kaigawa, Toyota (JP); Seiji Kuwahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 308 days.

(21) Appl. No.: 11/631,171

(22) PCT Filed: Apr. 7, 2006

(86) PCT No.: PCT/IB2006/000815

§ 371 (c)(1),
(2), (4) Date: Dec. 29, 2006

(87) PCT Pub. No.: WO2006/109127

PCT Pub. Date: Oct. 19, 2006

(65) Prior Publication Data

US 2008/0294301 A1    Nov. 27, 2008

(30) Foreign Application Priority Data

Apr. 15, 2005   (JP)   ............................... 2005-118381

(51) Int. Cl.
G05D 13/62   (2006.01)
G05D 17/02   (2006.01)
(52) U.S. Cl. ............................... 701/1; 701/36; 701/48; 701/37; 701/41; 701/70; 701/53; 701/54
(58) Field of Classification Search ...................... 701/1
See application file for complete search history.

(56) References Cited

U.S. PATENT DOCUMENTS

| | | | | | |
|---|---|---|---|---|---|
| 3,174,708 | A | * | 3/1965 | Miles | 244/17.25 |
| 6,128,564 | A | * | 10/2000 | Graf | 701/51 |
| 6,622,074 | B1 | * | 9/2003 | Coelingh et al. | 701/48 |
| 6,816,764 | B2 | * | 11/2004 | Coelingh et al. | 701/37 |
| 2003/0105573 | A1 | * | 6/2003 | Ishizu et al. | 701/93 |
| 2003/0205867 | A1 | * | 11/2003 | Coelingh et al. | 280/5.5 |
| 2003/0225494 | A1 | * | 12/2003 | Coelingh et al. | 701/48 |

(Continued)

FOREIGN PATENT DOCUMENTS

DE    103 34 536 A1    2/2004

(Continued)

*Primary Examiner*—Thomas G Black
*Assistant Examiner*—Shelley Chen
(74) *Attorney, Agent, or Firm*—Oliff & Berridge, PLC

(57) ABSTRACT

One of the manager control units among multiple control units includes a first coordination portion that coordinates a control target value derived based on an instruction from a driver or a first control unit and expressed by a first unit of physical quantity, with an instruction value from a second control unit and expressed by the first unit of physical quantity; a conversion portion that converts the control value expressed by the first unit of physical quantity into a control target value expressed by a second unit of physical quantity; a second coordination portion that coordinates the control target value derived by the conversion portion and expressed by the second unit of physical quantity, with an instruction value transmitted from a T/M control unit and expressed by the second unit of physical quantity; and an output portion that outputs the control target value to an engine control unit.

8 Claims, 2 Drawing Sheets

U.S. PATENT DOCUMENTS

| | | | |
|---|---|---|---|
| 2003/0225495 A1 * | 12/2003 | Coelingh et al. | 701/48 |
| 2003/0225496 A1 * | 12/2003 | Coelingh et al. | 701/48 |
| 2004/0044443 A1 * | 3/2004 | Eriksson | 701/1 |
| 2004/0048718 A1 * | 3/2004 | Tashiro | 477/175 |

FOREIGN PATENT DOCUMENTS

| | | |
|---|---|---|
| DE | 10334536 A1 * | 2/2004 |
| JP | A 5-085228 | 4/1993 |
| JP | A 10-250416 | 9/1998 |

* cited by examiner

VEHICLE INTEGRATED-CONTROL APPARATUS AND VEHICLE INTEGRATED-CONTROL METHOD

BACKGROUND OF THE INVENTION

1. Field of the Invention

The disclosure of Japanese Patent Application No. 2005-118381 filed on Apr. 15, 2005, including the specification, drawings and abstract is incorporated herein by reference in its entirety.

The invention relates to a vehicle integrated-control apparatus and method that controls multiple actuators mounted in a vehicle, in an integrated manner, using multiple control units.

2. Description of the Related Art

Japanese Patent Application Publication No. JP-A-05-85228 describes a vehicle integrated-control system in which control elements are hierarchically arranged. In the described vehicle integrated-control system, during the process of converting the input of a driver into a predetermined operation mode, at least one control element at a high hierarchical level passes the signal indicating the mode down to control elements at lower hierarchical levels. The lower-level systems are instructed to establish the mode indicated by the control elements at the higher hierarchical level.

The method of transmitting the input of the driver, which is adopted in the vehicle integrated-control system having the hierarchical structure, conforms with a top-down method in which the input of the driver (control target) is transmitted from control elements at the higher hierarchical levels to control elements at the lower hierarchical levels while being partitioned into control targets based on the mode that the lower-level systems is instructed to establish. However, in such a method, it is difficult to correct inappropriate partition when the control target is not appropriately partitioned based on the mode that the lower-level systems is instructed to establish, because there is no coordination portion that appropriately coordinates the control target with instructions from the lower-level systems. Also, if the specifications (functions and capacities) of the lower-level systems are changed, the method in which the control target from the upper-level systems is partitioned needs to be changed. It is, therefore, difficult to flexibly deal with such a change in the specifications of the lower-level systems.

SUMMARY OF THE INVENTION

It is, therefore, an object of the invention to provide a vehicle integrated-control apparatus that can flexibly deal with modifications made to functions and capacities of various control units, while appropriately coordinating instructions from the control units.

According to a first aspect of the invention, there is provided a vehicle integrated-control apparatus that controls, in an integrated manner, multiple actuators mounted in a vehicle using multiple control units some of which are manager control units. One of the manager control units includes a first coordination portion that coordinates a control target value that is derived based on an instruction from a driver or a first control unit, which is one of the multiple control units other than the manager control units, and that is expressed by a first unit of physical quantity, with an instruction value that is from a second control unit, which is one of the multiple control units other than the manager control units, and that is expressed by the first unit of physical quantity; a conversion portion that converts the control value, which has undergone a coordination process by the first coordination portion and which is expressed by the first unit of physical quantity, into a control target value expressed by a second unit of physical quantity; a second coordination portion that coordinates the control target value, which is derived by the conversion portion and which is expressed by the second unit of physical quantity, with an instruction value that is transmitted from a third control unit, which is one of the multiple control units other than the manager control units, and that is expressed by the second unit of physical quantity; and an output portion that outputs the control target value, which is derived by the second coordination portion, to a fourth control unit, which is one of the multiple control units other than the manager control units and which should achieve the control target value.

According to a second aspect of the invention, there is provided a control method performed by a vehicle integrated-control apparatus that controls, in an integrated manner, multiple actuators mounted in a vehicle using multiple control units some of which are manager control units. According to this method, a control target value that is derived based on an instruction from a driver or a first control unit, which is one of the multiple control units other than the manager control units, and that is expressed by a first unit of physical quantity, is coordinated with an instruction value that is from a second control unit, which is one of the multiple control units other than the manager control units, and that is expressed by the first unit of physical quantity. Then, the control value, which has undergone a coordination process by the first coordination portion and which is expressed by the first unit of physical quantity, is converted into a control target value expressed by a second unit of physical quantity. The control target value, which is derived by the conversion portion and which is expressed by the second unit of physical quantity, is coordinated with an instruction value that is transmitted from a third control unit, which is one of the multiple control units other than the manager control units, and that is expressed by the second unit of physical quantity. Then, the control target value, which is derived by the second coordination portion, is output to a fourth control unit, which is one of the multiple control units other than the manager control units and which should achieve the control target value.

In each of the first and second aspects, the control target values expressed by the first unit of physical quantity may be values of target driving force expressed by a unit of force, and the instruction values expressed by the second unit of physical quantity may be values of engine torque expressed by a unit of torque. Also, the instruction value from the second control unit may be expressed by a unit of force appropriate for an instruction from a dynamic stability control system that stabilizes a dynamic behavior of the vehicle. In addition, the third control unit may be a control unit that controls an actuator of a transmission, and the fourth control unit may be a control unit that controls an actuator of an engine.

With the vehicle integrated-control apparatus and method described above, it is possible to flexibly deal with modifications made to functions and capacities of various control units, while appropriately coordinating instructions from the control units.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE EXAMPLE EMBODIMENTS

In the following description and the accompanying drawings, the present invention will be described in more detail in terms of example embodiments. First, a vehicle including a vehicle integrated-control apparatus according to the invention will be schematically described with reference to FIG. 1.

Figure 1:
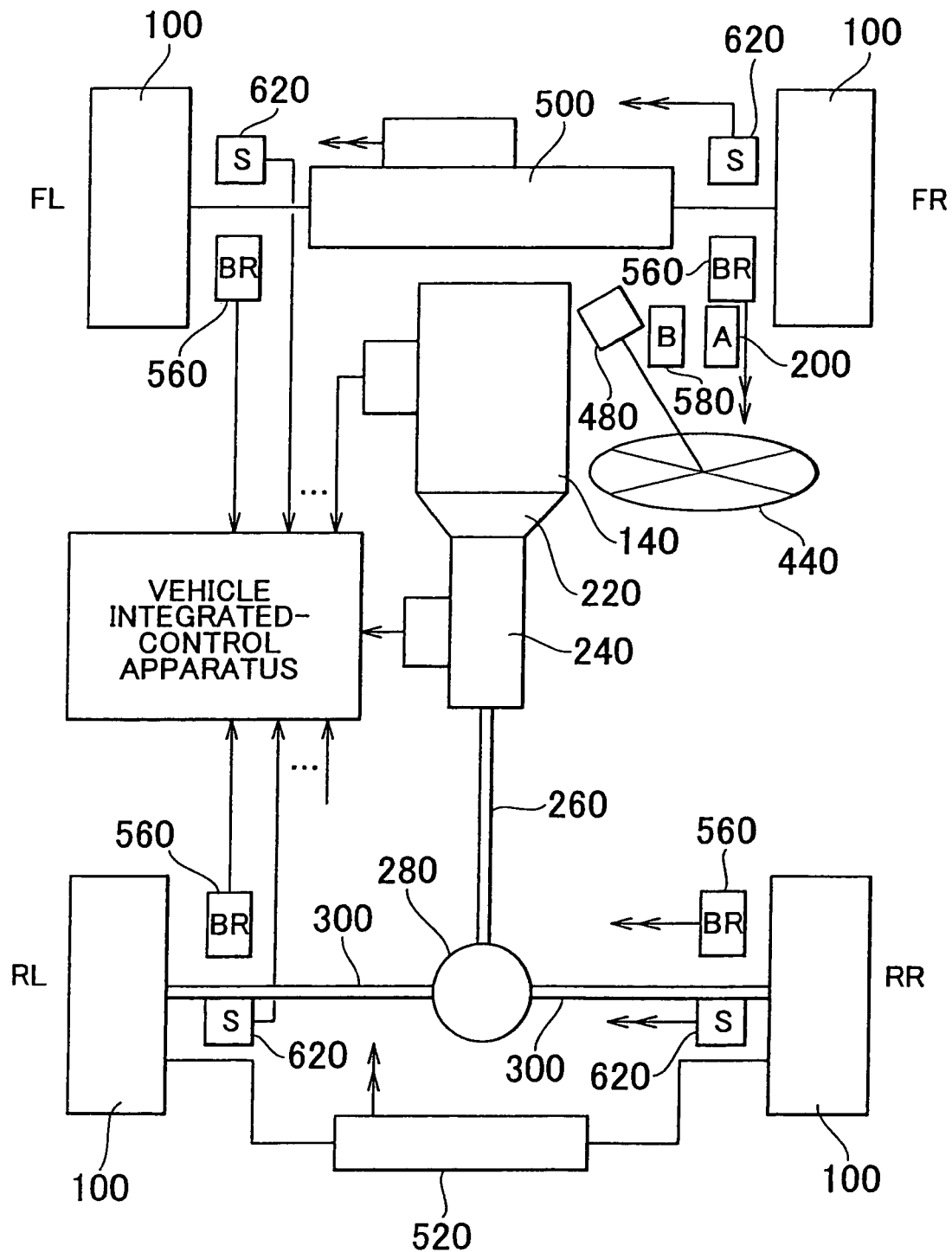
FIG. 1 illustrates the top view of a vehicle including a vehicle integrated-control apparatus according to the invention, in which a driving force control device is embedded.

The vehicle is provided with right and left front wheels 100 and right and left rear wheels 100. In FIG. 1, "FR" denotes the right front wheel, "FL" denotes the left front wheel, "RR" denotes the right rear wheel, and "RL" denotes the left rear wheel.

The vehicle includes an engine 140 as a power source. The power source is not limited to an engine. An electric motor may be used as the sole power source. Alternatively, an engine and an electric motor may be used in combination as the power source. The power source for the electric motor may be a secondary battery or a fuel cell.

The operating state of the engine 140 is electrically controlled based on the operation amount of an accelerator pedal 200 (one of the input members operated by the driver to control the forward movement, backward movement, speed, or acceleration of the vehicle) by the driver. If necessary, the operating state of the engine 140 may be automatically controlled independently of the operation of the accelerator pedal 200 by the driver.

The engine 140 is electrically controlled by electrically controlling, for example, the opening amount of a throttle valve (not shown) (hereinafter, referred to as a "throttle valve opening amount") provided in an intake manifold of the engine 140, the amount of fuel injected into a combustion chamber of the engine 140, or the angular position of an intake camshaft that adjusts the valve opening/closing timing.

The example vehicle is a rear-wheel drive vehicle where the right and left front wheels are the driven wheels and the right and left rear wheels are the drive wheels. Accordingly, the output shaft of the engine 140 is connected to the right and left rear wheels via a torque converter 220, a transmission 240, a propeller shaft 260, a differential gear unit 280, and a drive shaft 300 that rotates along with the rear wheels. The torque converter 220, the transmission 240, the propeller shaft 260, and the differential gear unit 280 are power transmission elements shared by the right and left rear wheels. However, the application of vehicle integrated-control apparatus according to the embodiment is not limited to rear-wheel drive vehicles. The vehicle integrated-control apparatus may be applied, for example, to front-wheel drive vehicles where the right and left front wheels are the drive wheels and the right and left rear wheels are the driven wheels. Also, the vehicle integrated-control apparatus may be applied to four-wheel drive vehicles where all the wheels are the drive wheels.

The transmission 240 is an automatic transmission. The automatic transmission electrically controls the speed ratio, based on which the speed of the engine 140 is converted into the rotational speed of the output shaft of the transmission 240. This automatic transmission may be either a stepped transmission or a continuously variable transmission (CVT).

The vehicle includes a steering wheel 440 operated by the driver. A steering reaction force supply device 480 electrically supplies the steering wheel 440 with a steering reaction force, that is, a reaction force corresponding to the operation of the steering wheel 440 performed by the driver (hereinafter, sometimes referred to as "steering"). The steering reaction force can be electrically controlled.

The orientation of the right and left front wheels, namely, the steering angle of the front wheels is electrically controlled by a front steering device 500. The front steering device 500 controls the steering angle of the front wheels based on the angle by which the driver has turned the steering wheel 440. If necessary, the front steering device 500 may automatically control the steering angle of the front wheels independently of the operation of the steering wheel 440 by the driver. In other words, the steering wheel 440 may be mechanically isolated from the right and left front wheels.

Similarly, the orientation of the right and left rear wheels, namely, the steering angle of the rear wheels is electrically controlled by a rear steering device 520.

The wheels 100 are provided with respective brakes 560 that are applied to suppress rotation of the wheels 100. The brakes 560 are electrically controlled based on the operation amount of a brake pedal 580 (one of the input members operated by the driver to control the forward movement, backward movement, speed, or deceleration of the vehicle) by the driver. If necessary, the wheels 100 may be individually and automatically controlled.

In the example vehicle, the wheels 100 are connected to the vehicle body (not shown) via respective suspensions 620. The suspension properties of each suspension 620 can be electrically controlled independently of the other suspensions 620.

The following actuators are used to electrically control the corresponding components described above:
(1) an actuator that electrically controls the engine 140;
(2) an actuator that electrically controls the transmission 240;
(3) an actuator that electrically controls the steering reaction force supply device 480;
(4) an actuator that electrically controls the front steering device 500;
(5) an actuator that electrically controls the rear steering device 520;
(6) actuators that electrically control the brakes 560; and
(7) actuators that electrically control the suspensions 620.

Only commonly used actuators are listed above. Whether all the actuators listed above are required depends on the specifications of the vehicles. Some vehicles do not include one or more actuators listed above. Alternatively, other vehicles may include other actuators, in addition to the actuators listed above, such as an actuator used to electrically control the ratio between the steering amount of the steering wheel 440 and the steered amount of the steered wheel (steering ratio), and an actuator used to electrically control a reaction force of the accelerator pedal 200. Accordingly, the invention is not limited to the particular actuator configurations mentioned above.

As shown in FIG. 1, the vehicle integrated-control apparatus that is mounted in the vehicle is electrically connected to the various actuators described above. A battery (not shown) serves as the electric power source for the vehicle integrated-control apparatus.

Figure 2:
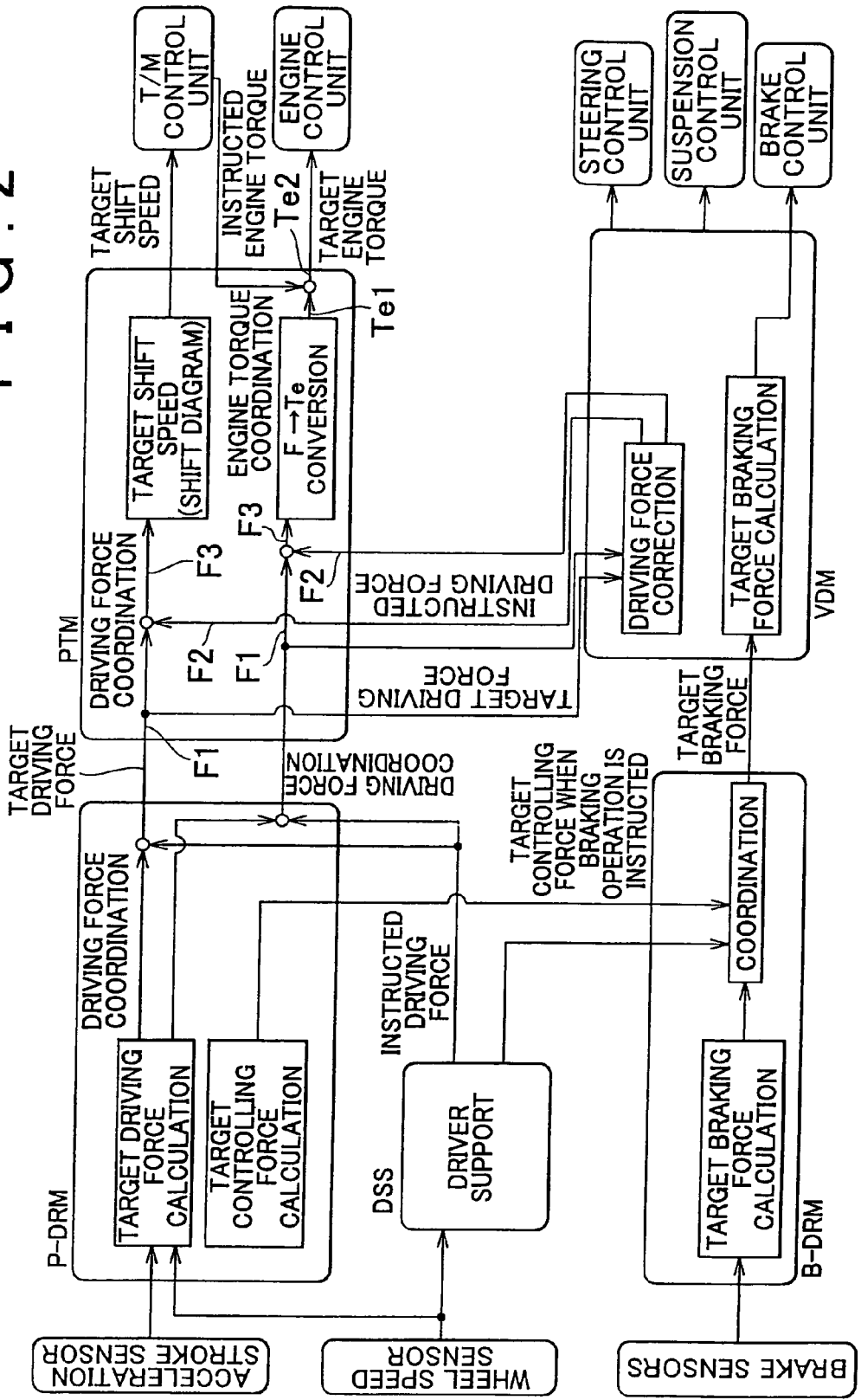
FIG. 2 illustrates the system diagram showing an example of the vehicle integrated-control apparatus according to an embodiment of the invention.

FIG. 2 illustrates the system diagram of the vehicle integrated-control apparatus according to the embodiment of the invention.

As in the case of a commonly used ECU (electronic control unit), each manager (and model) described below may be a microcomputer that includes, for example, ROM that stores control programs, RAM where results of calculations and the like are stored and the data can be retrieved and/or updated, a timer, a counter, an input interface, an output interface, and the like. In the following description, the control units are grouped by function, and referred, for example, to as a P-DRM, a VDM, and the like. However, the P-DRM, the VDM, and the like need not be configurations physically independent of each other. The P-DRM, the VDM, and the like may be configured integrally with each other using an appropriate software structure.

As shown in FIG. 2, at the highest level of the drive control system, a manager that functions as a driver's intention determining portion of the drive control system (hereinafter, referred to as a "P-DRM": Power-Train Driver Model) is arranged. At the highest level of the drive control system, a driver support system (hereinafter, referred to as a "DSS": Driver Support System) is arranged in parallel with the P-DRM.

At the level superior to the P-DRM, an acceleration stroke sensor is arranged. The acceleration stroke sensor produces an electric signal corresponding to the operation amount of the accelerator pedal 200, which directly reflects the input of the driver.

At the level superior to the DSS, wheel speed sensors are arranged. The wheel speed sensors are provided for the respective wheels 100. Each wheel speed sensor 100 outputs a pulse signal each time the wheel 100 rotates through a predetermined angle.

The P-DRM receives the signals output from the acceleration stroke sensor and the wheel speed sensors. At the highest level in the P-DRM, a target driving force calculation portion calculates a target driving force F1 (N) based on the accelerator pedal operation amount (%) and the wheel speed No (rpm) indicated by the electric signals from the acceleration stroke sensor and the wheel speed sensors, respectively. The target driving force F1 may be derived in the following manner: 1) the target acceleration G (m/s$^2$) is calculated based on an appropriate three-dimensional map using the accelerator pedal operation amount (%) and the wheel speed (rpm) as parameters, 2) the target driving force is derived by converting the target acceleration G (m/s$^2$) into the physical quantity suitable for force (N), and 3) the target driving force F1 is derived by correcting the target driving force using an uphill-slope compensation amount (N) that is determined based on running resistance (N) and a road inclination.

The signal indicating the target driving force F1 (N) thus determined is transmitted to the control elements at the subordinate levels via two signal lines extending from the target driving force calculation portion. Hereafter, the two routes through which the signal indicating the target driving force F1 is transmitted will be referred to as an "engine control system transmission route" and a "T/M control system transmission route". As shown in FIG. 2, if an instruction to correct the target driving force F1 (N) is provided by the DSS, the target driving force F1 (N) is coordinated with a driving force indicated by the instruction from the DSS in each route.

The DSS provides an appropriate instruction as an alternative to the input of the driver or an appropriate instruction to make a correction to the input of the driver, based on the information concerning obstacles located around the vehicle, which is captured, for example, by a camera or a radar, the road information and ambient area information obtained from a navigation system, the current position information obtained from a GPS positioning device of the navigation system, or various information obtained via communication with the operation center, vehicle-to-vehicle communication or road-to-vehicle communication. Examples of the instructions include an instruction provided by the DSS during the automatic cruise control or the automatic or semi-automatic running control similar to the automatic cruise control, and an instruction provided by the DSS while the intervention-deceleration control or steering assist control is performed, for example, to avoid an obstacle.

The target driving force F1 (N) that, if necessary, has undergone coordination is output to a power-train manager (hereinafter, referred to as a "PTM": Power-Train Manager). The PTM functions as an instruction coordination portion of the drive control system.

At the highest level of the PTM, the signal that indicates the target driving force F1 (N) from the P-DRM is transmitted to a manager of the dynamic behavior control system (hereinafter, referred to as a "VDM": Vehicle Dynamics Manager). The VDM is arranged at the level subordinate to a manager that functions as a driver's intention determining portion of the brake control system (hereinafter, referred to as a "B-DRM": Brake Driver Model). The VDM is a manager that functions as a vehicle movement coordination portion. Examples of such system that stabilizes the dynamic behavior of the vehicle include a traction control system (a system that suppresses unnecessary wheelspin of the drive wheels that is likely to occur when the vehicle starts or accelerates on a slippery road), a system that suppresses a side skid that is likely to occur when the vehicle enters a slippery road, a system that stabilizes the orientation of the vehicle to prevent the vehicle from spinning or sliding off the track if the stability reaches its limit when the vehicle is going round a curve, and a system that actively makes a difference in the driving force between the right and left rear wheels of the four-wheel drive vehicle, thereby causing a yaw moment.

At the level subordinate to the VDM, a steering control unit that controls the actuators for the front steering device 500 and the rear steering device 520, and a suspension control unit that controls the actuators for the suspensions 620 are arranged in parallel with the brake control unit that controls the actuators for the brakes 560. In the B-DRM, a target braking force calculation portion converts the electric signal transmitted from a brake sensor into a signal that indicates a target braking force. This signal is then transmitted via the VDM to the brake control unit. While not described in detail in this specification, the target braking force calculated by the target braking force calculation portion undergoes various correction (coordination) processes in the same or similar manner in which the target driving force F1 undergoes correction (coordination) processes, as described later in detail. Then, the signal that indicates the target braking force derived after correction (coordination) is output to the brake control unit.

The target driving force F1 is primarily determined based mainly on the input of the driver. A driving force correction portion of the VDM secondarily provides an instruction to correct the target driving force F1 to stabilize the dynamic behavior of the vehicle. Namely, the driving force correction portion of the VDM provides instructions to correct the target driving force F1, if necessary. In this case, preferably, the driving force correction portion of the VDM provides an instruction indicating the absolute amount of the target driving force that should replace the target driving force F1, not the correction amount AF by which the target driving force F1 should be increased or t decreased. Hereafter, the absolute amount of the target driving force indicated by the instruction from the VDM, which is derived from the target driving force F1, will be referred to as a "target driving force F2".

As shown in FIG. 2, a signal that indicates the target driving force F2 is input in the PTM. As shown in FIG. 2, the signal that indicates the target driving force P2 is input in each of the engine control system transmission route and the T/M control system transmission route. At the input portion of each route, the target driving force F2 is coordinated with the target driving force F1. In this coordination process, preferably, a higher priority is given to the target driving force F2 than to the target driving force F1, because a higher priority should be given to a stable dynamic behavior of the vehicle. Alternatively, the final target driving force may be derived by appropriately assigning weights to the target driving force F2 and the target driving force F1. To give a higher priority to the stable dynamic behavior of the vehicle, the greater weight should be assigned to the target driving force F2 than to the target driving force F1. The target driving force derived through such coordination process will be referred to as a "target driving force F3".

In the TIM control system transmission route, the target driving force F3 is converted into the throttle valve opening amount Pa (%), and the signal indicating the throttle valve opening amount Pa (%) is transmitted to a target shift speed setting portion, as shown in FIG. 2. The target shift speed setting portion sets the final target shift speed based on the predetermined shift diagram (shift diagram indicating the relationship between the throttle valve opening amount and the wheel speed No). The final target shift speed may be directly set based on the predetermined shift diagram (shift diagram indicating the relationship between the driving force and the wheel speed No) without converting the target driving force F3 into the throttle valve opening amount Pa (%).

The signal that indicates the target shift speed thus set in the PTM is output to the T/M control unit arranged at the level subordinate to the PTM. The T/M control unit controls the actuator for the transmission 240 to achieve the target shift speed.

In the engine control system transmission route, an "F→Te conversion portion" converts the mode of expressing the target driving force F3 from the mode where it is expressed by the driving force (N) to the mode where it is expressed by the engine torque (Nm), as shown in FIG. 2. An engine torque coordination portion coordinates a thus derived target engine torque Te1 (Nm) with the instructed engine torque (Nm) indicated by the signal transmitted from the T/M control unit to the PTM. The target engine torque derived through such coordination will be referred to as a "target engine torque Te2". The engine torque coordination portion may perform the coordination process according to any methods. For example, a higher priority may be given to the instructed engine torque (Nm) from the TIM control unit.

The signal indicating the target engine torque Te2 is output to the engine control unit arranged at the level subordinate to the PTM. The engine control unit and the T/M control unit control the actuator for the engine 140 to achieve the target engine torque indicated by the signal from the PTM.

According to the embodiment described so far, the target driving force F1 calculated by the target driving force calculation portion of the P-DRM undergoes various correction (coordination) processes, and the signal indicating the tar-et driving force that has undergone various correction (coordination) processes is output to the engine control unit and the T/M control unit. These control units control the actuators for the engine 140 and the transmission 240, whereby the target driving force F1 (if the target driving force F1 has undergone the coordination process, the target driving force F2 or the target driving force F3) is achieved.

The driving performance varies depending on vehicle types (due to this, specifications of the engine control units and the T/M control units (software structures) vary depending on the vehicle types). In consideration of this, preferably, such a system is configured to flexibly deal with the variation in the driving performance among the vehicle types and modifications of the driving performance.

From this viewpoint, according to the embodiment, the target driving force F1, which is determined by the P-DRM arranged at the upper level of the system based mainly on the input of the driver, undergoes various correction (coordination) processes in consideration of the driving performance of the vehicle, etc. Thus, the system can deal with variation in driving performance by only changing the mode of correction (coordination) process performed by the control elements at the intermediate level of the system (modification need not be made to the control elements at the upper level of the system (e.g. P-DRM)). As a result, the system generality improves.

Also, according to the embodiment described above, the engine torque (Nm) indicated by the instruction from the T/M control unit is coordinated with the target engine torque Te1 by the engine torque coordination portion arranged in the PTM, not by the engine control unit. Thus, almost all the software structures of the engine control unit can be shared by the vehicles having different driving performance (e.g. specifications of the transmission 240 such as shifting properties and shifting manners (e.g., CVT) and specifications of the engine 140 (e.g., diesel engines, gasoline engines, direct-injection engines, port-injection engines). As a result, the system generality improves.

According to the embodiment, in addition to the effects described above, the prominent effect described below can be obtained, because each coordination portion performs the coordination process using the unit of physical quantity appropriate for an instruction. Because the VDM is basically the system that control driving force, preferably, instructions from the VDM are provided and the coordination process is performed using the unit of driving force (unit of force). Because the T/M control unit is basically a unit that controls driving torque, preferably, instructions from the T/M control unit are provided and the coordination process is performed using the unit of engine torque (unit of torque). According to the embodiment described above, because instructions are provided and the coordination processes are performed using the appropriate units of physical quantities, appropriate coordination processes suitable for the instructions can be performed. In addition, the unit of physical quantity need not be changed between when the coordination process is performed and when an instruction is provided. Also, modification of the communication software structure due to the change in the unit of physical quantity can be avoided. As a result, inefficiency caused by such change and modification can be effectively minimized.

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

For example, in the embodiment described above, the P-DRM, the PTM and a portion having a specific function (e.g. the driving force coordination portion in the P-DRM), which have the similar function, may be arranged as the portions having the function on the PTM side. Alternatively, they may be arranged as the portions having the function on the P-DRM side.

In the embodiment described above, the engine 140 includes an electronic throttle valve, and is used as the power source. However, the invention may be applied to a configuration where the motor without an electronic throttle valve is used as the power source.

The invention claimed is:

1. In a vehicle integrated-control apparatus that controls, in an integrated manner, multiple actuators mounted in a vehicle using multiple control units some of which are manager control units, one control unit among the manager control units comprises:

a first coordination portion that coordinates a control target value that is derived based on an instruction from a driver or a first control unit, which is one of the multiple control units other than the manager control units, and that is expressed by a first unit of physical quantity, with an instruction value that is from a second control unit, which is one of the multiple control units other than the manager control units, and that is expressed by the first unit of physical quantity;

a conversion portion that converts the control value, which has undergone a coordination process by the first coordination portion and which is expressed by the first unit of physical quantity, into a control target value expressed by a second unit of physical quantity;

a second coordination portion that coordinates the control target value, which is derived by the conversion portion and which is expressed by the second unit of physical quantity, with an instruction value that is transmitted from a third control unit, which is one of the multiple control units other than the manager control units, and that is expressed by the second unit of physical quantity; and an output portion that outputs the control target value, which is derived by the second coordination portion, to a fourth control unit, which is one of the multiple control units other than the manager control units and which should achieve the control target value.

2. The vehicle integrated-control apparatus according to claim 1, wherein the control target values expressed by the first unit of physical quantity are values of target driving force expressed by a unit of force, and the instruction values expressed by the second unit of physical quantity are values of engine torque expressed by a unit of torque.

3. The vehicle integrated-control apparatus according to claim 1 wherein the instruction value from the second control unit is expressed by a unit of force appropriate for an instruction from a dynamic stability control system that stabilizes a dynamic behavior of the vehicle.

4. The vehicle integrated-control apparatus according to claim 1, wherein the third control unit is a control unit that controls an actuator of a transmission, and the fourth control unit is a control unit that controls an actuator of an engine.

5. A control method performed by a vehicle integrated-control apparatus that controls, in an integrated manner, multiple actuators mounted in a vehicle using multiple control units some of which are manager control units, comprising:

coordinating a control target value that is derived based on an instruction from a driver or a first control unit, which is one of the multiple control units other than the manager control units, and that is expressed by a first unit of physical quantity, with an instruction value that is from a second control unit, which is one of the multiple control units other than the manager control units, and that is expressed by the first unit of physical quantity;

converting the control value, which has undergone a coordination process by the first coordination portion and which is expressed by the first unit of physical quantity, into a control target value expressed by a second unit of physical quantity;

coordinating the control target value, which is derived by the conversion portion and which is expressed by the second unit of physical quantity, with an instruction value that is transmitted from a third control unit, which is one of the multiple control units other than the manager control units, and that is expressed by the second unit of physical quantity; and outputting the control target value, which is derived by the second coordination portion, to a fourth control unit, which is one of the multiple control units other than the manager control units and which should achieve the control target value.

6. The control method according to claim 5, wherein
the control target values expressed by the first unit of physical quantity are values of target driving force expressed by a unit of force, and the instruction values expressed by the second unit of physical quantity are values of engine torque expressed by a unit of torque.

7. The control method according to claim 5, wherein
the instruction value from the second control unit (VDM) is expressed by a unit of force appropriate for an instruction from a dynamic stability control system that stabilizes a dynamic behavior of the vehicle.

8. The control method according to claim 5, wherein
the third control unit is a control unit that controls an actuator of a transmission, and the fourth control unit is a control unit that controls an actuator of an engine.

* * * * *